United States Patent Office 3,605,589
Patented Sept. 20, 1971

3,605,589
WARNING CIRCUIT FOR AN ELECTRONIC SHUTTER
Masaji Minegishi, Yokohama-shi, and Asao Hayashi, Tokyo, Japan, assignors to Olympus Optical Company, Ltd., Tokyo, Japan
Filed Feb. 14, 1969, Ser. No. 799,340
Claims priority, application Japan, Feb. 20, 1968, 43/10,263
Int. Cl. G03b 7/08
U.S. Cl. 95—10C
10 Claims

ABSTRACT OF THE DISCLOSURE

Warning circuit for an electronic shutter having an exposure time controlling circuit comprised of a series circuit consisting of a photoconductive element exposed to the light and a capacitor connected in series thereto, a switching circuit connected to the series circuit to be controlled thereby, shutter actuating means connected to the switching means, a D.C. source connected to the series circuit and the switching circuit, and warning means selectively connectable to the switching circuit in place of the shutter actuating means. An A.C. source is selectively connectable to the series circuit in place of the D.C. source when the warning means in connected to the switching circuit in place of the shutter actuating means.

A diode is connected in parallel to the capacitor when the A.C. source is connected to the series circuit so as to apply half wave A.C. voltage to the capacitor, and a smoothing circuit is connected to the capacitor for smoothing the half wave A.C. voltage supplied from the capacitor so that the switching circuit is controlled properly by comparing the smoothed voltage from the smoothing circuit with a reference voltage.

BACKGROUND OF THE INVENTION

The present invention relates to a warning circuit for an electronic shutter.

In a known electronic shutter, a photoconductive element which varies its electric resistance in accordance with the brightness of the light received thereby is connected in series to a capacitor and the charging of the capacitor through the photoconductive element is commenced in coupled relation to the opening of the shutter blades of the electronic shutter so that the shutter blades are closed when the terminal voltage of the capacitor reaches a predetermined set reference voltage.

With such an electronic shutter, the shutter speed can be automatically controlled for the proper exposure in accordance with the brightness of the light received by the photoconductive element.

When the brightness is too great, however, overexposure might occur, even through the electronic shutter is actuated at the highest shutter speed obtained by the electronic shutter, for example, $\frac{1}{1000}$ sec., because the shutter speed required for the proper exposure exceeds the highest shutter speed of the electronic shutter which is limited by the mechanical construction thereof. To the contrary, when the brightness is too low, under exposure might occur even though the shutter is actuated at the lowest shutter speed possible by the mechanical construction thereof, or dangling or fluttering of the shutter might occur during the exposure by the shutter resulting in blurring of the image of the object.

It has been proposed to provide a warning means in the shutter which supplies a signal when the brightness is not appropriate for the proper exposure by the shutter, or which is coupled with release means in the electronic shutter for locking it when the brightness is not appropriate for the proper exposure by the shutter.

In order to provide such a warning means it has been proposed to provide a shutter exposure time controlling circuit in the electronic shutter which comprises a series circuit consisting of a photoconductive element and a capacitor connected in series but separated from the remaining portion of the electric circuit in the shutter, and the series circuit is supplied with A.C. power from an A.C. source when the warning means is to be operated, and a switching circuit in the electric shutter is actuated in accordance with the voltage produced at the juncture between the photoconductive element and the capacitor during the time the photoconductive element is exposed to the light so that the voltage at the juncture is varied in accordance with the variation in the electric resistance resulting from the brightness, thereby permitting the warning means to be actuated by the switching circuit for indicating the improper condition for the exposure by the shutter or locking the release means so as to prevent the shutter from being operated under the improper condition for the exposure.

Such a warning circuit is advantageous in comparison with a separate warning circuit provided in addition to the electric circuit for the electronic shutter per se, because the electric circuit can be commonly used as the warning circuit by merely swithing the connection therein thereby making the construction of the electronic shutter simpler, and, at the same time, the adjustment of the electronic shutter for various film sensitivities to be exposed can be made by merely varying the capacity of the capacitor. This feature is particularly advantageous for use in microscopic photography.

In such a circuit, however, it is necessary to use a nonpolarized capacitor, because A.C. voltage is applied to the capacitor from the A.C. source when the warning means is to be actuated. Further, when a lamp is used as the warning means, the variation in the energization of the lamp in accordance with the brightness depends only upon the fraction of the time period in each cycle of the A.C. in which the lamp is energized, thereby making it difficult to properly indicate whether or not the brightness is inappropriate for the proper exposure by the electronic shutter. On the other hand, in a warning circuit of the type described above in which the warning lamp is extinguished when the voltage appearing at the juncture between the photo-conductive element and the capacitor exceeds a predetermined level of the reference voltage, the lamp is necessarily energized during each half cycle of the A.C., thereby making it impossible to completely extinguish the lamp so that the proper operation of the warning device cannot be expected.

SUMMARY OF THE INVENTION

One object of the present invention is to provide a novel and useful warning circuit for an electronic shutter of the type described above which avoids the above described disadvantages of the prior art.

The present invention provides a novel and useful warning circuit for an electronic shutter having an exposure time controlling circuit comprised of a series circuit consisting of a photoconductive element adapted to receive the light to be measured and a capacitor connected in series to the photoconductive element to be charged therethrough from a D.C. source connected to the series circuit in accordance with the brightness received by the photoconductive element, the series circuit being separable from the remaining portion of the electric circuit in the electronic shutter so as to be supplied with A.C. voltage from an A.C. source connected to the series circuit in place of the D.C. source so that a switching circuit connected to the juncture between the photoconductive element and the capacitor is controlled by the voltage provided at the juncture in accordance with the brightness by comparing the voltage at the juncture with a reference voltage supplied to the switching circuit so that warning means selectively connected to the switching circuit when the A.C. source is connected to the series circuit is operated for indicating the condition of the electronic shutter for the proper or improper exposure time the voltage appearing at the juncture between the photoconductive element and the capacitor when the A.C. source is connected to the series circuit is rectified and smoothed to provide a D.C. voltage level before it is supplied to the switching circuit thereby insuring the switching circuit to be operated properly and exactly for correct operation of the warning means.

A further object of the present invention is to provide a warning circuit of the type described above which comprises means connected to the release means in the electronic shutter so that the release of the shutter is prevented when the light is not appropriate for the proper exposure by the electronic shutter.

For this purpose the warning circuit has a diode connectable in parallel to the capacitor in the shutter exposure time controlling circuit when the A.C. source is connected thereto for providing rectified half wave A.C. power to be applied to the capacitor from the A.C. source, and a smoothing circuit connected to the capacitor for smoothing the rectified half wave A.C. voltage from the capacitor so that the smoothed voltage is supplied to the switching circuit for allowing it to properly control the warning device connected thereto in cooperation with the reference voltage supplied to the switching circuit.

The other objects and advantages will be apparent by reading the following description with reference to the accompanying drawings illustrating the preferred embodiment of the present invention.

In accordance with the present invention, since the diode is connected in parallel to the capacitor, only the polarized voltage or the voltage having one polarity of the A.C. is supplied from the A.C. source to the capacitor and the voltage having the opposite polarity is prevented from being supplied to the capacitor, any polarized capacitor can be used as the capacitor in the shutter exposure time controlling circuit, thereby permitting a small size capacitor to be utilized.

Further, since the smoothing circuit is provided in the warning circuit in accordance with the present invention, and the rectified half wave A.C. voltage from the capacitor is smoothed so as to provide a D.C. voltage level, this D.C. voltage level is compared with the reference voltage in the switching circuit so that the switching circuit can be positively and exactly controlled for operating the warning means connected thereto. In case a lamp is used as the warning means, the lamp can be properly energized or extinguished for the correct indication.

DETAILED DESCRIPTION OF THE PREFERRED EMBODIMENT

Figure 1:
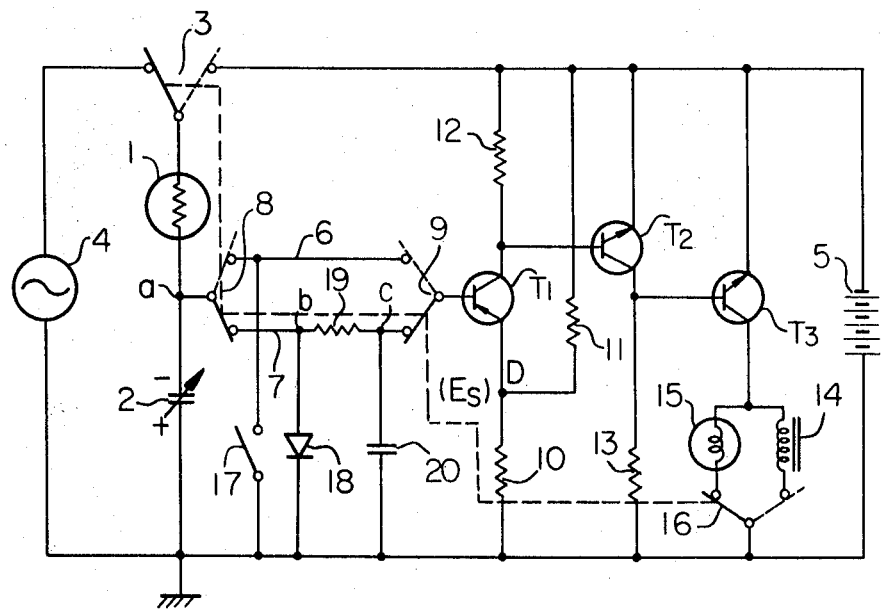
FIG. 1 is a diagram showing the electric circuit of the preferred embodiment of the warning circuit constructed in accordance with the present invention.

In FIG. 1, the shutter exposure time controlling circuit comprises a photoconductive element 1 which varies its electric resistance in accordance with the brightness of the light received thereby and a capacitor 2 connected in series to the photoconductive element 1 is selectively connectable through a switch 3 to an A.C. source 4 or to a D.C. source 5, and the positive terminal of the D.C. source is grounded together with one terminal of the A.C. source 4 as shown.

The juncture a between the photoconductive element 1 and the capacitor 2 is selectively connectable to one end of line 6 or line 7 through a switch 8. A switch 9 is adapted to seelctively connect either of the opposite ends of the lines 6 and 7 to the base of a first transistor $T_1$ in a switching circuit comprised of the first transistor $T_1$, a second transistor $T_2$ and a third transistor $T_3$. As shown, the emitter of the first transistor $T_1$ is connected to a voltage divider D consisting of resistors 10 and 11 connected in series, the opposite ends thereof being connected to the respective terminals of the D.C. source 5 so that a reference voltage Es is provided at the voltage divider D. The reference voltage $E_s$ is determined by the electric resistance of each of the resistors 10 and 11. The collector of the transistor $T_1$ is connected to the negative terminal of the D.C. source 5 through a resistor 12 as well as to the base of the second transistor $T_2$. The emitter of the transistor $T_2$ is connected to the negative terminal of the D.C. source 5 while the collector thereof is connected to the positive terminal of the D.C. source 5 through a resistor 13 as well as to the base of the third transistor $T_3$. The emitter of the transistor $T_3$ is connected to the negative terminal of the D.C. source 5 while shutter actuating means 14, such as an electromagnetic relay for holding the shutter blades in opened state when it is energized, and warning means 15, such as a lamp, are connected to the collector of the transistor $T_3$ in parallel relation to each other. The opposite terminals of the shutter actuating means 14 and the warning means 15 are selectively connectable to the positive terminal of the D.C. source 5 through a switch 16.

A switch 17 is connected between the line 6 and the positive terminal of the D.C. source 5. This switch 17 may be coupled with the release means of the electronic shutter such that it momentarily closes at the time when the release means is actuated for opening the shutter blades thereby permitting the capacitor 2 to be momentarily discharged at the beginning of the opening of the shutter blades.

In accordance with the characteristic feature of the present invention, a diode 18 is connected between the point b in the line 7 and the positive terminal of the D.C. source 5 and a smoothing circuit comprised of a resistor 19 placed in the line 7 and a capacitor 20 connected between the point c in the line 7 and the positive terminal of the D.C. source 5 is provided as shown.

It is apparent that, when A.C. voltage is applied to the diode 18 from the A.C. source 4 by appropriately operating the switches 3 and 8, it rectifies the A.C. current supplied from the A.C. source 4 so that half wave A.C. current is allowed to flow between the point b in the line 7 and the grounded side of the A.C. source 4 and, hence, the capacitor 2 is energized only by the half wave A.C. voltage having the opposite polarity to that of the half wave A.C. current allowed to flow through the diode 18.

As previously described, the electric resistance of the photoconductive element 1 varies in accordance with the brightness of the light received thereby. Therefore, when the series circuit comprised of the photoconductive element 1 and the capacitor 2 is energized by the D.C. source 5 by operating the switch 3 while the photoconductive element 1 is exposed to the light, the charging rate of the capacitor 2 or the increasing rate of the voltage produced at the juncture $a$ varies in accordance with the brightness received by the photoconductive element 1, and the varying rate of the voltage described above is utilized to determine the proper exposure time as described later.

Figure 2:
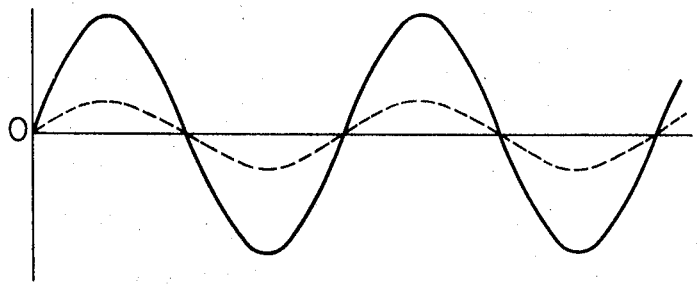
FIG. 2 is a diagram showing the A.C. wave forms of the A.C. voltage supplied from the shutter exposure time controlling circuit of the present invention.
Figure 3:
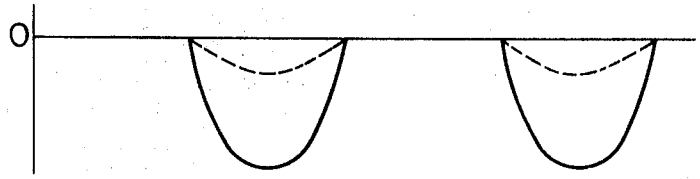
FIG. 3 is a diagram similar to FIG. 2 but showing the rectified half wave forms of the A.C. voltage to be supplied to the switching circuit from the shutter exposure time controlling circuit by the provisions of the diode in accordance with the present invention.

On the other hand, when the series circuit comprised of the photoconductive element 1 and the capacitor 2 is energized by the A.C. source 4 by switching the switch 3, the voltage produced at the juncture $a$ varies as shown in FIG. 2, and the amplitude of the voltage varies in accordance with the brightness received by the photoconductive element 1. Assuming that the electric resistance of the photoconductive element 1 decreases as the brightness received thereby increases, the amplitude of the voltage at the juncture $a$ increases as shown by the solid line in FIG. 2, when the brightness increases. To the contrary, when the brightness received by the photoconductive element 1 decreases so that the electric resistance thereof is increased, the amplitude of the voltage provided at the juncture $a$ decreases as shown by the broken line in FIG. 2. Since the A.C. voltage applied to the capacitor 2 is rectified by the provision of the diode 18 as shown, when the diode 18 is connected in parallel to the capacitor 2 by operating the switch 8, the half wave A.C. voltage applied to the capacitor 2 is in the form having the negative polarity as shown in FIG. 3, and the amplitude of the half wave A.C. voltage applied to the capacitor 2 varies in accordance with the brightness received by the photoconductive element 1. The greater the intensity of the light received by the photoconductive element 1, the greater the amplitude of the half wave A.C. voltage applied to the capacitor 2 as shown in the solid line in FIG. 3, and, as the intensity of the light decreases, the amplitude is decreased as shown in the broken line in FIG. 3.

The arrangement of the switching circuit comprised of the transistors $T_1$, $T_2$ and $T_3$ and the resistors as shown in FIG. 1 is so determined that, when negative voltage greater in magnitude than the reference voltage $E_s$ is applied to the base of the transistor $T_1$ from either of the lines 6 and 7, is made conductive so that the transistor $T_2$ is also made conductive by the application of negative voltage from the collector of the transistor $T_1$ to the base of transistor $T_2$. This, in turn, makes the transistor $T_3$ inoperative thereby disconnecting the supply of the D.C. current from the D.C. source 5 to the shutter actuating means 14 or the warning means 15.

To the contrary, when the transistor $T_1$ is inoperative depending upon the voltage supplied to the base thereof, the transistor $T_2$ is also inoperative while the transistor $T_3$ is operative so as to actuate either the shutter actuating means 14 or the warning means 15.

Now the operation of the warning circuit of the present invention will be explained.

The switches 3, 8, 9 and 16 are in the positions shown by the solid lines in FIG. 1. These switches may be coupled with each other so as to operate them simultaneously. Further, these switches may be operatively coupled with the release means in the electronic shutter so that, when the release means is actuated, the switches 3, 8, 9 and 16 are switched as shown by the broken lines in FIG. 1, while these switches are positioned as shown by the solid lines in FIG. 1 when the release means is not actuated.

The series circuit comprised of the photoconductive element 1 and the capacitor 2 is energized by the A.C. source 4. Thus, A.C. voltage having the amplitude as shown in FIG. 2 is produced at the juncture $a$ between the photoconductive element 1 and the capacitor 2. The amplitude of the A.C. voltage varies in accordance with the intensity of the light incident to the photoconductive element 1 as previously described.

Since the diode 18 is connected in parallel to the capacitor 2, the half wave A.C. current having the positive polarity flows through the diode 18 from the point $b$ in the line 7 to ground while the half wave A.C. voltage having the negative polarity is left so as to be applied to the capacitor 2 from the juncture $a$ as shown. Thus, the half wave A.C. voltage in the line 7 is in the form having the negative polarity as shown in FIG. 3. Therefore, the capacitor 2 is charged as shown, the upper side of the capacitor 2 being negative while the lower side thereof is positive. Since any voltage having the opposite polarity to that described above is not applied to the capacitor 2, a capacitor having a single polarity or a polarized capacitor can be used as the capacitor 2 thereby making it possible to make the warning circuit compact.

Figure 4:
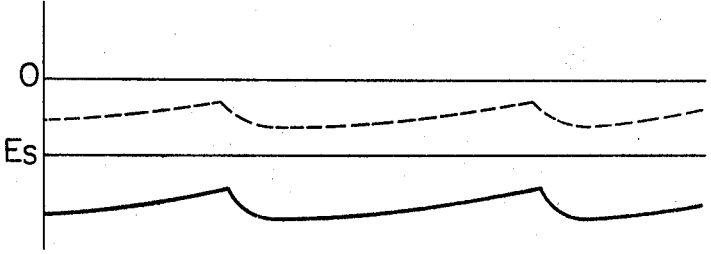
FIG. 4 is a diagram showing the smoothed wave forms obtained from the rectified half wave forms of the A.C. voltage shown in FIG. 3 by the provision of the smoothing circuit in accordance with the present invention.

The thus obtained half wave A.C. voltage having the negative polarity as shown in FIG. 3 is smoothed by the smoothing circuit comprised of the resistor 19 and the capacitor 20 so as to provide a D.C. voltage level having the negative polarity as shown in FIG. 4. The magnitude of the thus provided D.C. voltage level varies in accordance with the brightness incident to the photoconductive element 1. Therefore, when the brightness is great, the magnitude of the D.C. voltage level having the negative polarity is great as shown by solid line in FIG. 4, and vice versa, the voltage level obtained when the brightness is low being shown by the broken line in FIG. 4.

The D.C. voltage level thus provided by the smoothing circuit is applied to the base of the first transistor $T_1$ of the switching circuit. Since the emitter of the transistor $T_1$ is biased by the reference voltage $E_s$ as set by the voltage divider comprised of the resistors 10 and 11, the transistor $T_1$ is made operative when the brightness is higher and, hence, the magnitude of the negative D.C. voltage level applied to the base of the transistor $T_1$ exceeds the reference voltage $E_s$. Thus, the transistor $T_2$ is made also operative, so that the transistor $T_3$ is made inoperative thereby disconnecting the warning means 15 from the D.C. source 5 so that the warning means 15, such as a lamp, is extinguished to provide a warning to the operator. When the D.C. voltage level applied to the base of the transistor $T_1$ is positive in comparison with the reference voltage $E_s$ depending upon the intensity of the light incident to the photoconductive element 1, the transistors $T_1$ and $T_2$ are made inoperative and, hence, the transistor $T_3$ is made operative thereby permitting the warning means 15 to be energized so as to indicate that the proper exposure can be effected by the electronic shutter under the condition of the existing brightness.

The reference voltage $E_s$ is set so as to make the transistor $T_3$ inoperative at the critical level of the brightness beyond which the electronic shutter cannot be operated for the proper exposure by appropriately selecting the electric resistance of each of the resistors 10 and 11.

The above described D.C. voltage level, i.e. the critical voltage level indicating the condition of the brightness for the proper or improper exposure of the electronic shutter can be adjusted by varying the A.C. voltage supplied by the A.C. source 4.

Now, the operation of the electronic shutter will be described hereinbelow.

As previously described, the switches 3, 8, 7 and 16 may be switched to the positions as shown by the broken lines in FIG. 1 in coupled relation to the actuation of the release means in the electronic shutter and the switch 17 is momentarily closed so as to discharge the capacitor 2 when the release means is operated to open the shutter blades. Thus, in the operation of the electronic shutter, the switches 3, 8, 9 and 16 are positioned as shown by the broken lines in FIG. 1 and the switch 17 is momentarily closed to discharge the capacitor 2 to be ready for being charged after the shutter blades are opened by the actuation of the release means. Then, the capacitor 2 is charged through the photoconductive element 1 from the D.C. source 5. The time required for completing the charging of the capacitor 2 is determined by the electric resistance of the photoconductive element 1 variable in response to the brightness of the light received thereby as well as the capacity of the capacitor 2. While the capacitor 2 is being charged, the voltage applied to the base of the transistor $T_1$ is positive in comparison with the reference voltage $E_s$ and the first transistor $T_1$ is inoperative, so that the second transistor $T_2$ is also made inoperative, while the third transistor $T_3$ is operative, thereby permitting the shutter actuating means 14, such as an electromagnetic relay, to be energized so as to hold the shutter blades opened as long as the shutter actuating means 14 is energized. After the predetermined time period, when the voltage of the capacitor 2 is made greater in magnitude in a negative sense in comparison with the reference voltage $E_s$, the first transistor $T_1$ is made conductive thereby rendering the second transistor $T_2$ operative so that the third transistor $T_3$ is made inoperative. Thus, the shutter actuating means 14 is deenergized thereby closing the shutter blades. As described above, the reference voltage $T_s$ is so selected that the proper exposure time is obtained by deenergizing the shutter actuating means 14 in response to the brightness received by the photoconductive element 1 and, hence, the voltage applied from the capacitor 2 to the base of the transistor $T_1$ which is compared with the reference voltage $E_s$ so as to operate the shutter actuating means 14 through the switching circuit.

In the electric circuit in accordance with the present invention as described above, the adjustment for the various film sensitivities can be effected by merely varying the capacity of the capacitor 2. Also, the warning means 15, such as a lamp, is shown as being placed in the collector circuit of the third transistor $T_3$ so that the lamp is energized when the proper exposure is effected under the existing brightness. However, the lamp may be placed in the collector circuit of the second transistor $T_2$ so that the lamp is energized when the brightness is not appropriate for the proper exposure by the electronic shutter.

In the embodiment described as above, the warning circuit is actuated when the brightness increases beyond the critical value at which the proper exposure cannot be obtained even though the shutter is actuated at the maximum shutter speed limited by the mechanical construction of the shutter. However, the warning circuit of the present invention can be operated so as to detect the lowest brightness for the proper exposure by the shutter by lowering the voltage level of the A.C. source 4 and also lowering the reference voltage $E_s$ appropriately.

It must be noted that the present invention is not limited by the embodiment as described above, but various variations and modifications can be made within the scope and spirit of the present invention.

For example, an electromagnet or a galvanometer can be used in place of the lamp 15 shown in FIG. 1 and the electromagnet or the galvanometer is operatively coupled with the release means of the electronic shutter so that the actuation of the release means is prevented when the brightness is not appropriate for the proper exposure by the shutter.

What is claimed is:

1. Warning circuit for an electronic shutter having an exposure time controlling circuit comprising a series circuit consisting of a photoconductive element adapted to receive light to be measured and a capacitor connected in series to said photoconductive element to be charged therethrough, a D.C. source and an A.C. source selectively connected to said series circuit, a switching circuit connected to the juncture between said photoconductive element and said capacitor, the switching circuit being controlled by the voltage provided at said juncture in accordance with the brightness of the light by comparing said voltage with a reference voltage supplied to said switching circuit, warning means selectively connected to said switching circuit when said A.C. source is connected to said series circuit for indicating the condition of said electronic shutter for the proper or improper exposure time, wherein the improvement comprises a diode connected in parallel to said capacitor whereby only a rectified half wave A.C. voltage is applied to said capacitor from said A.C. source through said photoconductive element when said A.C. source is connected to said series circuit, and a smoothing circuit connected to said capacitor for smoothing the rectified half wave A.C. voltage supplied therefrom, said smoothed voltage from said smoothing circuit being compared with said reference voltage for control of said switching circuit.

2. Warning circuit according to claim 1, wherein said warning means comprises a lamp.

3. Warning circuit according to claim 1, wherein the capacity of said capacitor is adjustable so that the warning circuit is adjusted for various film sensitivities to be exposed by said electronic shutter.

4. Warning circuit according to claim 2, wherein said lamp is extinguished when the scene brightness is not appropriate for the proper exposure by the electronic shutter.

5. Warning circuit according to claim 2, wherein said lamp is energized when the scene brightness is not appropriate for the proper exposure by the electronic shutter.

6. Warning circuit for an electronic shutter having an exposure time controlling circuit comprising a series circuit consisting of a photoconductive element adapted to receive the light from a scene and a capacitor connected in series to said photoconductive element, a switching circuit connected between the juncture of said photoconductive element and said capacitor, shutter actuating means in said electronic shutter for controlling the actuation of said shutter, a D.C. source for energizing said series circuit and said switching circuit and also providing a reference voltage for said switching circuit, switch means adapted to momentarily discharge said capacitor when said series circuit is connected to said D.C. source so that said capacitor begins to be energized through said photoconductive element by said D.C. source thereby providing a voltage at said juncture between said photoconductive element and said capacitor in accordance with the brightness of the scene light received by said photoconductive element, said voltage provided at said juncture being compared with said reference voltage thereby permitting said shutter actuating means to be controlled by said switching circuit in accordance with the scene brightness for the proper exposure time, an A.C. source selectively connected to said series circuit in place of said D.C. source, and warning means selectively connected to said switching circuit in place of said shutter actuating means when said A.C. source is selectively connected to said series circuit in place of said D.C. source, said warning means being operated by said switching circuit in accordance with the brightness of the scene light received by said photoconductive element which provides a voltage at said juncture by said A.C. source in cooperation with said capacitor, said voltage being compared with said reference voltage for indicating the condition of said electronic shutter for the proper or improper exposure time, wherein the improvement comprises a diode connected in parallel to said capacitor for providing half wave A.C. voltage to be applied to said capacitor from said A.C. source through said photoconductive element when said A.C. source is connected to said series circuit and a smoothing circuit connected to said capacitor for smoothing the rectified half wave A.C. voltage supplied therefrom, said smoothed voltage from said smoothing circuit being compared with said reference voltage so as to properly control said switching circuit.

7. Warning circuit according to claim 6, wherein means is provided for simultaneously connecting said A.C. source to said series circuit, said diode to said capacitor, and said warning means to said switching means.

8. Warning circuit according to claim 6, wherein means is provided which is coupled with release means of the electronic shutter for momentarily closing said switch means in synchronism with the actuation of said release means.

9. Warning circuit according to claim 6, wherein said shutter actuating means comprises an electromagnetic relay coupled with a shutter blade actuating mechanism in the electronic shutter.

10. Warning circuit according to claim 6, wherein said reference voltage is produced by a voltage divider connected to said D.C. source, and said switching means comprises transistors selectively actuated in accordance with the voltage of the juncture between said photoconductive element and said capacitor which is compared with said reference voltage.

References Cited

UNITED STATES PATENTS

| | | | |
|---|---|---|---|
| 3,397,629 | 8/1968 | Mori et al. | 95—10(C) |
| 3,460,450 | 8/1969 | Ogihara | 95—10(C) |
| 3,464,773 | 9/1969 | Waz | 95—10(C)X |
| 3,483,429 | 12/1969 | Encel et al. | 315—159X |
| 3,495,515 | 2/1970 | Reimann | 356—226X |

SAMUEL S. MATTHEWS, Primary Examiner

M. L. GELLNER, Assistant Examiner

U.S. Cl. X.R.

250—214P; 317—130